US009201912B2

(12) United States Patent
Odenheimer et al.

(10) Patent No.: US 9,201,912 B2
(45) Date of Patent: Dec. 1, 2015

(54) AUDITABLE ABROGATION OF PRIVACY ENHANCEMENTS IN COLUMNAR IN-MEMORY DATABASES

(71) Applicants:Jens Odenheimer, Walldorf (DE); Udo Klein, Walldorf (DE)

(72) Inventors: Jens Odenheimer, Walldorf (DE); Udo Klein, Walldorf (DE)

(73) Assignee: SAP AG, Walldorf (DE)

( * ) Notice: Subject to any disclaimer, the term of this patent is extended or adjusted under 35 U.S.C. 154(b) by 288 days.

(21) Appl. No.: 13/926,622

(22) Filed: Jun. 25, 2013

(65) Prior Publication Data

US 2014/0379737 A1 Dec. 25, 2014

(51) Int. Cl.
*G06F 17/30* (2006.01)

(52) U.S. Cl.
CPC ........ *G06F 17/303* (2013.01); *G06F 17/30569* (2013.01)

(58) Field of Classification Search
USPC ................................................. 707/736, 756
See application file for complete search history.

(56) References Cited

U.S. PATENT DOCUMENTS

| 5,079,739 | A | * | 1/1992 | Petersen .................. G06F 7/78 358/1.1 |
| 5,887,183 | A | * | 3/1999 | Agarwal et al. .................. 712/2 |
| 6,134,664 | A | | 10/2000 | Walker |
| 6,253,203 | B1 | | 6/2001 | O'Flaherty et al. |
| 6,275,824 | B1 | | 8/2001 | O'Flaherty et al. |
| 7,155,612 | B2 | | 12/2006 | Licis |
| 7,437,362 | B1 | | 10/2008 | Ben-Natan |
| 7,650,512 | B2 | | 1/2010 | Karimisetty et al. |
| 7,743,069 | B2 | | 6/2010 | Chitkara et al. |
| 7,844,829 | B2 | | 11/2010 | Meenakshisundaram |
| 2009/0119416 | A1 | * | 5/2009 | Sirdevan et al. ............... 709/246 |
| 2009/0150866 | A1 | * | 6/2009 | Schmidt ......................... 717/120 |
| 2011/0264667 | A1 | * | 10/2011 | Harizopoulos et al. ........ 707/743 |
| 2012/0023030 | A1 | * | 1/2012 | Jeffries ........................... 705/319 |
| 2012/0179723 | A1 | * | 7/2012 | Lin et al. ........................ 707/792 |
| 2012/0310874 | A1 | * | 12/2012 | Dantressangle .. G06F 17/30321 707/600 |
| 2013/0073515 | A1 | * | 3/2013 | Bhide ............... G06F 17/30563 707/602 |
| 2013/0132371 | A1 | * | 5/2013 | Bharath ............ G06F 17/30463 707/719 |
| 2014/0059085 | A1 | * | 2/2014 | Schreck ......................... 707/801 |
| 2014/0172775 | A1 | | 6/2014 | Niehoff et al. |

OTHER PUBLICATIONS

Henry Kam,SAP BusinessObjects BI Platform 4.0 Administration Improvements,Sep. 2, 2014,37 Pages,SAP AG, Walldorf,Germany, http://events.asug.com/2012BOUC/0510_SAP_BusinessObjects_BI_Platform_4_0_Administration_Improvements.pdf.

IBM Software,IBM InfoSphere Guardium Encryption Expert helps secure SAP data, Sep. 2011,4 Pages,IBM Corporation,N.Y,U.S.A, http://public.dhe.ibm.com/common/ssi/ecm/en/ims14375usen/IMS14375USEN.PDF.

(Continued)

*Primary Examiner* — Cam-Linh Nguyen
(74) *Attorney, Agent, or Firm* — Sterne, Kessler, Goldstein & P.L.L.C.

(57) ABSTRACT

Disclosed herein are system, method, and computer program product embodiments for the auditable abrogation of columnar in-memory databases. An embodiment operates by retrieving column-oriented data of a column-oriented database associated with an auditing request to access the column-oriented data. The column-oriented data is transformed into corresponding row-oriented data and stored in a row-oriented database independent of the column-oriented database. A response to the auditing request is processed based on the row-oriented data, wherein the processing is performed independent of the column-oriented database, and the response is provided to the auditing request.

23 Claims, 4 Drawing Sheets

(56) References Cited

OTHER PUBLICATIONS

Juergen Thomas,SQL Server 2012 Technologies for SAP Solutions,Apr. 2012,25 Pages,Microsoft,Redmond WA, http://www.ciosummits.com/media/pdf/solution_spotlight/SQL%20Server%202012%20Technologies%20for%20SAP%20Solutions.pdf.

SAP Canada,Vormetric data security for SAP,Mar. 3, 2009,2 Pages,Vormetric, Inc.,SAP Canada,http://www.vormetric.com/sites/default/files/sb-data-security-for-sap.pdf.

SAP SE,11.SAP HANA Appliance Software SPS 05,Jul. 15, 2014,3 Pages,SAP SE,Walldorf,Germany,http://help.sap.com/hana/hana_admin_en.pdf.

SAP SYBASE,Securing Your Data Assets Using SAP® Sybase® IQ Advanced Security Option,Sep. 2, 2014,12 Pages, SAP AG,Walldorf,Germany, http://m.sybase.com/files/White_Papers/SY-IQ-Adv-Security-Option-WP.pdf.

\* cited by examiner

AUDITABLE ABROGATION OF PRIVACY ENHANCEMENTS IN COLUMNAR IN-MEMORY DATABASES

BACKGROUND

Databases are generally stored either on disk storage or in a more accessible memory location. Whether a database is stored on disk storage or within memory often depends on a number of factors, including what data is being stored on the database and how that database is being used. For example, when speed is a key performance metric, a database will often be stored in memory, while most other databases will be stored on disk storage.

Databases however, no matter if they are accessed from disk storage or memory, may be subject to and must comply with occasional audits in which an outside party requires access to the database. The problem created by database audits however is that speed or performance often suffers when an auditing entity is provided high-priority audit access to the database, particularly with regard to in-memory databases for which speed is a key performance metric.

BRIEF DESCRIPTION OF THE DRAWINGS

The accompanying drawings are incorporated herein and form a part of the specification.

In the drawings, like reference numbers generally indicate identical or similar Elements. Additionally, generally, the left-most digit(s) of a reference number identifies the drawing in which the reference number first appears.

DETAILED DESCRIPTION

Provided herein are system, method and/or computer program product embodiments, and/or combinations and subcombinations thereof, for providing auditable abrogation for an in-memory database.

Figure 1:
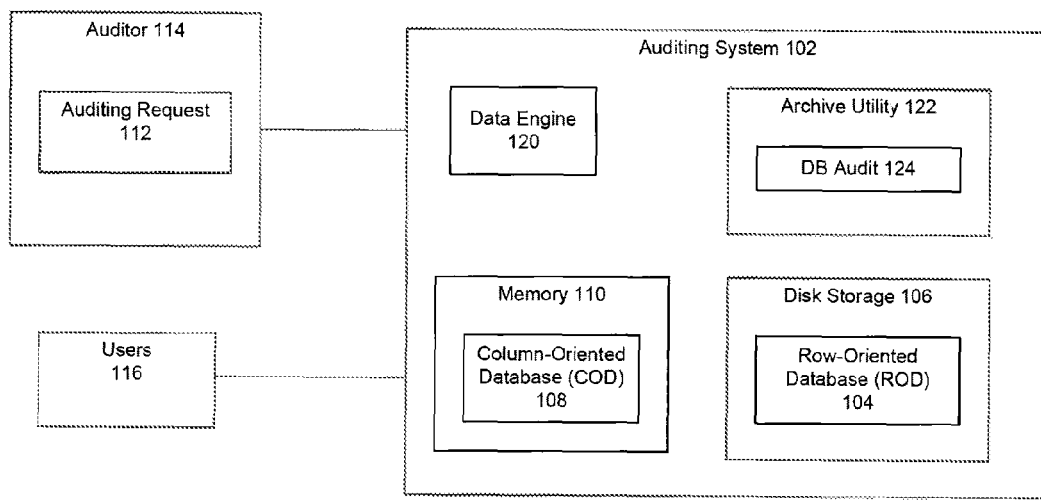
FIG. 1 is a block diagram 100 of an auditing system 102 for auditable abrogation of an in-memory database, according to an example embodiment.

FIG. 1 is a block diagram 100 of an auditing system 102 for auditable abrogation of an in-memory database, according to an example embodiment.

Databases are typically organized as either row-oriented databases, or column-oriented databases. A row-oriented database (ROD) 104 is generally stored on a disk 106, while a column-oriented database (COD) 108 is generally stored in memory 110. A record in ROD 104 may be a row of data, in which each entry of the record may correspond to a column of ROD 104. A record in COD 108 may be a column of data, in which each entry of the record may correspond to a row of COD 108.

Memory 110 may include a main memory of one or more computing devices. Memory 110 may be, for example, random access memory (RAM). Memory 110 may include volatile memory. Disk storage 106, by contrast, may include non-volatile memory. In an embodiment, COD 108 may include a portion of data stored in ROD 104, and may periodically be backed-up on ROD 104, or COD 108 may be updated with data from ROD 104. In an embodiment, memory 110 may be any storage location on one or more computing devices that may provide faster or more efficient access to stored data than disk storage 106 would provide with similarly stored data.

In an embodiment, ROD 104, being accessed from disk storage 106, may provide data persistency features that are more advantageous or robust than the data persistency generally provided by COD 108. For example, while the data of ROD 104 may be stored and accessed from non-volatile memory of disk storage 106, the data of COD 108 may be stored and accessed from volatile memory of memory 110. In an embodiment, both ROD 104 and COD 108 may be accessed from either volatile or non-volatile memory. Most traditional databases are organized as RODs 104.

Though ROD 104 often provides data persistency over COD 108, COD 108 often provides performance (speed) advantages over COD 108. For example, data may be accessed from COD 108 more quickly (e.g., requiring less resources, overhead, or time) than data may be accessed from ROD 104. As such, both COD 108 and ROD 104 varying benefits and tradeoffs. However, when performance or speed is a more critical feature than persistency (for example, when real-time or time sensitive data is provided), data is often stored as COD 108 instead of ROD 104. Or, in an embodiment, though data may be persisted as ROD 104, some or all of the data may be copied into COD 108 for access by one or more users 116.

When speed is amongst the metrics driving the use of COD 108 in lieu of ROD 104, an increase or reprioritization in the transactions being handled by COD 108 may hurt performance. For example, additional transactions to be handled or processed by COD 108 may increase the latency of COD 108, particularly if those additional transactions are deemed high priority or blocking transactions. Such transactions may include one or more auditing requests 112.

In an embodiment, auditing system 102 may include COD 108. COD 108 may handle requests or transactions for users 116 as part of its normal or regular operations. However, COD 108 may be required (e.g., legally required), to process one or more auditing requests 112 from an auditor 114 as well. Auditing request 112 may be any request or transactions submitted or requested by auditor 114. Auditing requests 112 may include requests to view, copy, edit, annotate, of otherwise access the data of COD 108. Users 116 may include any regular or non-auditing users or systems that access the data of COD 108.

Auditor 114 may be any entity or system that is legally entitled to or otherwise granted access, often priority access, to COD 108. Auditor 114 may be a government entity, such as a law enforcement agency, or an otherwise legally-entitled (e.g., by law or court order) private party or system. In an embodiment, auditor 114 may not have a legally enforceable right to access COD 108, but instead may be voluntarily granted access by a party that operates or owns COD 108 and who is authorized to grant such access to COD 108.

Examples of situations when auditor 114 may be legally entitled to access COD 108 may include an order under legislation (such as the Freedom of Information Act or Homeland Security Action), or under court order. Or, for example, auditing request 112 may be associated with an audit or inspection of the data of COD 108. Example audits include a compatibility audit, financial audit, macro-environment audit, legal audit, environmental audit, marketing audit, production audit, management audit, information systems audit, or reconciliation or accounting audit.

Auditor 114 may make one or more auditing requests 112 for processing by auditing system 102, which may be deemed higher priority requests than those requests received from users 116. For example, auditing system 116 may block all other requests from users 116 until one or more auditing requests 112 have been processes. As a result, blocking requests from users 116 or otherwise providing auditing requests 112 with a higher priority than requests from users 116 may adversely impact the performance, responsiveness, or latency of how quickly COD 108 is able to process and/or respond to requests from users 116. Auditing system 102 provides a process by which performance of COD 108 may not be as adversely impacted by auditing requests 112, as may otherwise be the case. For example, auditing system 102 may copy data of COD 108 into a ROD 104, and providing auditor 114 access to ROD 104 while users 116 access COD 108. An archive utility 122 may then track any auditing requests 112 submitted to, or otherwise processed by ROD 104.

In an embodiment, data of COD 108 may be privatized. Privatized data may include, for example, only allowing registered users to view or otherwise access the data. For example, in order to access COD 108 a user may need a username and password. Privatized data may include, for example, segmenting the data such that particular users (e.g., associated with particular roles) may only access that data of COD 108 that they are authorized to access, or that may be necessary for them to perform the functions associated with their roles. For example, while a user who is an accountant may be able to access accounting data, a user who is in human resources (HR) may not be able to access accounting data except as it may be required for or segmented for the performance of HR tasks.

For data stored in ROD 104, auditor 114 may be provided a username and password that allows auditor 114 to access whatever data auditor 114 is authorized to access or may otherwise be associated with auditing requests 112. However, such a response to auditing requests 112 may be prohibitive if the data is stored in COD 108, because providing auditor 114 such priority access to data of COD 108 may adversely impact the performance of COD 108 with respect to users 116, who may require real-time or close to real-time access to the data. For example, COD 108 may be associated with sales or a marketplace, for which real-time data is required to be accessed by one or more users 116, and for which response time is critical, particularly during business hours. If auditor 114 was to be provided with a username and password to access COD 108, the performance of COD 108 with respect to users 116 may suffer while auditing requests 112 are being processed ahead of requests from users 116.

However, in order to remain complaint with a legally enforceable or otherwise granted auditing request 112, auditing system 102 may provide auditor 114 with access to a copy of the data (or a portion thereof) from COD 108 as may be copied from COD 108, transformed, and stored as ROD 104.

A data engine 120 may receive auditing request 112. Rather than providing priority access to COD 108 in response to auditing request 112, data engine 120 may provide auditing request 112 to an archive utility 122. Archive utility 122 may track where data of auditing system 102 is stored. In an embodiment, archive utility 122 may track the data stored in both COD 108 and ROD 104. Data engine 120 may be a processing engine 120 that processes data requests or transactions, and requests data from archive utility 122.

Archive utility 122 may retrieve the requested data of COD 108 as indicated by auditing request 112, and return that data to data engine 120. Data engine 120 may then transform the returned column-oriented data of COD 108 into row-oriented data for storage in ROD 104. Data engine 120 may then provide the transformed row-oriented data to archive utility 122 for storage in ROD 104. Archive utility may then track or monitor how auditor 114 interacts with the data of ROD 104, while users continue interacting with the data of COD 108.

Transforming column-oriented data of COD 108 into row-oriented data may include first copying the data from COD 108. For example, archive utility 122 may copy the data from COD 108, and data engine 120 may transform the copied data into a format corresponding to how ROD 104 is organized. In another embodiment, archive utility 122 may perform the data transformation process. The data transformation process may include a remapping or reconfiguration of data records from the column-oriented records of COD 108, into row-oriented records for storage in ROD 104. In an embodiment, the operations of COD 108 may be paused while archive utility 122 copies data from COD 108, and may resume operations when the data is copied. Data engine 120 may then transform the requested data from COD 108, which is stored on ROD 104.

Archive utility 122 may then store the transformed records in ROD 104. In an embodiment, if COD 108 includes a full or partial subset of data already stored in ROD 104, then the copy and transform operations may not need to be performed, and only the corresponding data storage locations may be identified by archive utility 122 in ROD 104. As will be discussed further below, auditor 114 may then be granted access to the data of ROD 104 (corresponding to the data requested via auditing request 112).

As part of the transformation process, archive utility 122 or data engine 120 may remove any data privatization features of the data, or otherwise provide auditor 114 with access to ROD 104 such that auditor 114 is able to access all the required data, independent of any privatization features. Auditor 114 may then have unblocked access to ROD 104 for any subsequent auditing requests 112.

In an embodiment, the data of ROD 104 may be periodically updated with data of COD 108, which may have changed since the data from COD 108 was previously copied. For example, upon detecting an update or change to data of COD 108, data engine 120 may provide the corresponding update to archive utility 122 for updating the corresponding data of ROD 104.

Performing a copy command on all or a portion of data of COD 108 provides efficiency with regard to maintaining a performance or speed (e.g., responsiveness to requests from users 116) of COD 108, compared to allowing auditor 114 unblocked access to data of COD 108. For example, auditor 114 may be required to have unblocked priority access to data and/or data engine 120 which may process requests or transactions to COD 108. To provide such access to auditor 114 may require that COD 108 suspend or block normal or other requests from users 116 until auditing request 112 has been processed, thus severely impacting performance of COD 108. As discussed above, after performing a copy or transformation command on the data of COD 108, COD 108 may resume normal processing of requests from users 116.

Archive utility 122 may maintain a database audit (DB audit) 124. DB audit 124 may be an audit or log of auditing requests 112. Archive utility 122 may intercept, process, or track auditing requests 112 to ROD 104 and responses from ROD 104 to auditing requests 112, and log the requests 112 and responses in DB audit 124. DB audit 124 may include such information as which auditor 114 requested the data, when the data was requested, what data was requested, and what process was performed on the data (e.g., view, copy, edit, etc.).

Figure 2:
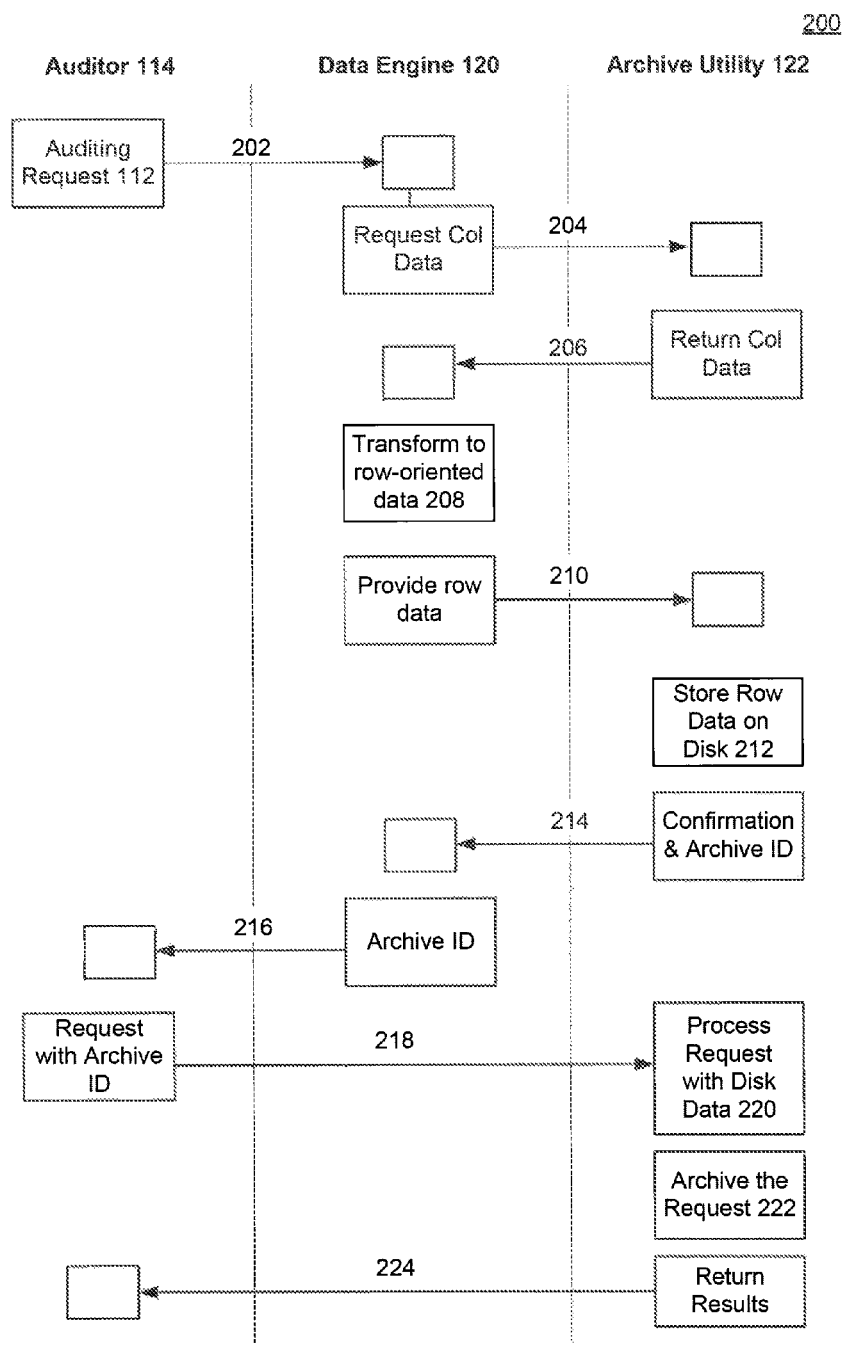
FIG. 2 is a swim lane diagram illustrating a process for the auditable abrogation of an in-memory database, according to an example embodiment.

FIG. 2 is an example swim-lane diagram 200, the auditing and abrogation of an in-memory database, according to an example embodiment.

At stage 202, auditing request 112 may be received by data engine 120. Auditing request 112 may include a request to view or access data stored in a column-oriented database (e.g., COD 108). At stage 204, data engine 120 may request the data corresponding to auditing request 112 from archive utility 122. In an embodiment, archive utility 122 may store or track where data of COD 108 and/or ROD 104 is stored. At stage 206, archive utility 122 may return the requested column-oriented data of COD 108 to data engine 120. For example, archive utility 122 may provide a pointer to or memory location of the data in COD 108.

At stage 208, data engine 120 may transform the column-oriented data into row-oriented data. At stage 210, the transformed row-oriented data may be provided to archive utility 122 for storage. In an embodiment, when it is said that data is provided between the data engine 120 and archive utility 122, it may be that a pointer to or memory address of the respective data is provided instead of a copy of or the actual data itself that is being internally transmitted between components of auditing system 102.

At stage 212, archive utility 212 may store the row-oriented data on disk storage 106 in ROD 104. At stage 214, a confirmation that the row-oriented data has been stored may be provided to data engine 120 with an archive identifier (ID). The archive ID may be a pointer or other reference to a memory or database location where the transformed row-oriented data is stored on the disk.

At stage 216, the archive ID may be provided to auditor 114. At stage 218, auditor 114 may submit an auditing request 112 with the archive ID to archive utility 122. At stage 220, archive utility 122 may process the auditing request 112. For example, the archive ID may indicate which data is associated with the request, and archive utility 122 may provide auditor 114 with access to and/or otherwise perform the requested transaction on the data corresponding to the archive ID.

At stage 222, archive request 112 and the processed response (e.g., from stage 220) may be logged or archived (e.g., in DB audit 124). At stage 224, the result may be returned to auditor 114. Subsequent requests may then begin at stage 218 if associated with the same or existing archive ID or previously archived data. If however additional data is requested, the process may be repeated from stage 202.

Figure 3:
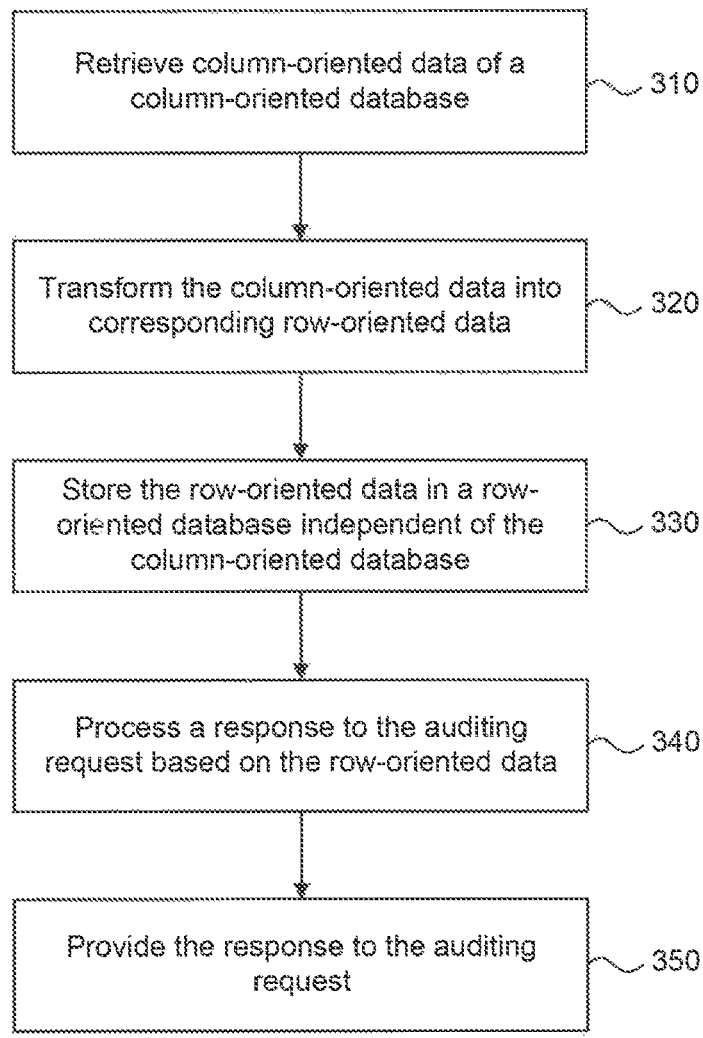
FIG. 3 is a flowchart illustrating a process for the auditable abrogation of an in-memory database, according to an example embodiment.

FIG. 3 is a flowchart 300 illustrating a process for the auditable abrogation of an in-memory database, according to an example embodiment.

At stage 310, column-oriented data of a column-oriented database associated with an auditing request is retrieved. For example, auditor 114 may be any entity that is granted or otherwise allowed priority access to data of auditing system 102. Auditor 114 may submit one or more auditing requests 112 to access or view the data of COD 108. Archive utility 122 may track and retrieve the data of archive request 112 from COD 108.

At stage 320, the column-oriented data is transformed into corresponding row oriented data. For example, data engine 120 (or in another embodiment archive utility 122) may transform the column-oriented data retrieved from COD 108 into row-oriented data for storage on ROD 104.

At stage 330, the row-oriented data is stored in a row-oriented database independent of the column-oriented database. For example, archive utility 122 may store the transformed row-oriented data in ROD 104. ROD 104 may be accessed and/or modified independently of COD 108. ROD 104 may, for example, be stored in a different memory or storage location than COD 108, such as in disk storage 106.

At stage 340, a response to the auditing request is processed. For example, once data has been stored on ROD 104, data engine 120 may process the auditing request 112 on the data of ROD 104. In another embodiment, archive utility 122 or another independent data engine (e.g., similar to data engine 120) may exist to handle processing requests associated with the data of ROD 104.

At stage 350, the response is provided to the auditing request. For example, once auditing request 112 has been processed, archive utility 122 may archive auditing request 112, and the corresponding response. The response may include providing auditor 114 with an archive ID that corresponds to one or more locations of data associated with or otherwise processed as a result of archive request 112.

Example Computer System

Figure 4:
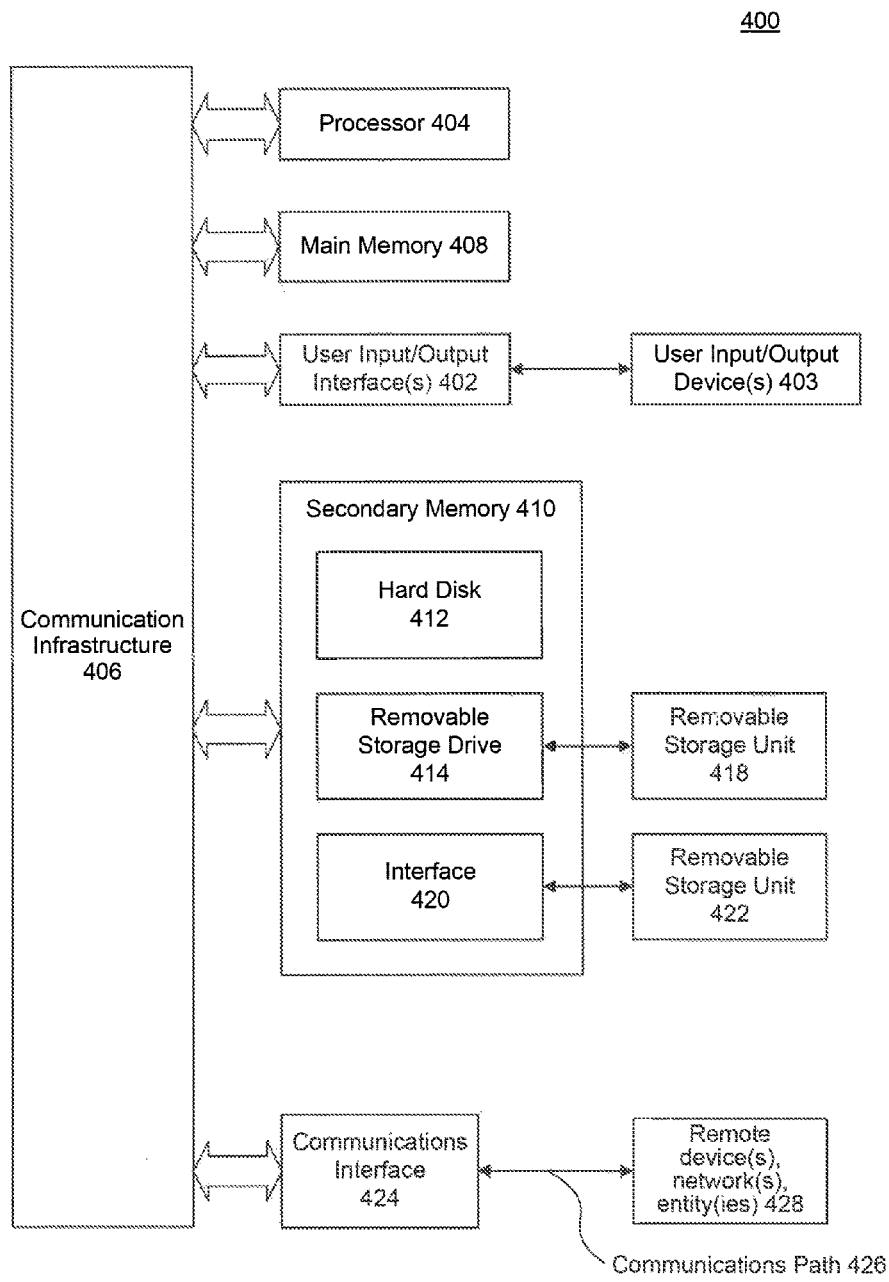
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the disclosed embodiments using data processing devices, computer systems and/or computer architectures other than that shown in FIG. 4. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments, have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method comprising:
    retrieving column-oriented data of a column-oriented database associated with an auditing request to access the column-oriented data;
    transforming, by a hardware processor coupled to a hardware memory, the column-oriented data into corresponding row-oriented data;
    storing the row-oriented data in a row-oriented database independent of the column-oriented database;
    processing a response to the auditing request based on the row-oriented data, wherein the processing is performed independent of the column-oriented database; and
    providing the response to the auditing request.

2. The method of claim 1, wherein the column-oriented database is stored in a random access memory of one or more computing devices, and the row-oriented database is stored on a hard disk of one or more computing devices.

3. The method of claim 1, wherein the auditing request is associated with a legally-enforceable auditing of the column-oriented database.

4. The method of claim 1, further comprising:
    archiving the auditing request and response.

5. The method of claim 1, wherein the column-oriented data is privatized across one or more users of the column-oriented database, wherein only a portion of the column-oriented data is accessible to one or more of the users.

6. The method of claim 5, wherein the transforming comprises:
    de-privatizing the privatized column-oriented data, wherein the auditing request has access to the de-privatized row-oriented data that is privatized in the column-oriented database.

7. The method of claim 1, wherein the column-oriented database is stored at a first storage location and the row-oriented database is stored at a second storage location, wherein the first location provides access to the column-oriented data of the column-oriented database faster than the second location provides access to the corresponding row-oriented data of the row-oriented database.

8. A system comprising:
    a hardware processor coupled to a hardware memory, the processor comprising a data engine configured to:
        receive an auditing request associated with column-oriented data of a column-oriented database associated with an auditing request to access the column-oriented data;

receive the column-oriented data associated with the request from the column-oriented database, and
transform the column-oriented data into corresponding row-oriented data; and
an archive utility configured to:
store the row-oriented data in a row-oriented database independent of the column-oriented database, and
process and provide the row-oriented data responsive to one or more subsequent auditing requests, wherein the processing and providing are performed independent of the column-oriented database.

9. The system of claim 8, wherein the column-oriented database is stored in a random access memory of one or more computing devices, and the row-oriented database is stored on a hard disk of one or more computing devices.

10. The system of claim 8, wherein the auditing request is associated with a legally-enforceable auditing of the column-oriented database.

11. The system of claim 8, wherein archive utility configured to process and provide archives the requested, processed, and provided data associated with the one or more subsequent auditing requests.

12. The system of claim 8, wherein the column-oriented data is privatized across one or more of the users of the column-oriented database, wherein only a portion of the column-oriented data is accessible to one or more of the users.

13. The system of claim 12, wherein the data engine is configured to de-privatize the row-oriented data stored in the row-oriented database corresponding the privatized column-oriented data, wherein the auditing request has access to the de-privatized row-oriented data.

14. The system of claim 8, wherein the column-oriented database is stored on a first memory and the row-oriented database is stored on a second memory, wherein the first memory provides access to the column-oriented data of the column-oriented database faster than the second memory provides access to corresponding row-oriented data of the row-oriented database.

15. A computer-readable device having instructions stored thereon, execution of which, by at least one computing device, causes the at least one computing device to perform operations comprising:
retrieving column-oriented data of a column-oriented database associated with an auditing request to access the column-oriented data;
transforming, by the at least one hardware computing device coupled to a hardware memory, the column-oriented data into corresponding row-oriented data;
storing the row-oriented data in a row-oriented database independent of the column-oriented database;
processing a response to the auditing request based on the row-oriented data, wherein the processing is performed independent of the column-oriented database; and
providing the response to the auditing request.

16. The computer-readable device of claim 15, wherein the column-oriented database is stored in a random access memory of one or more computing devices, and the row-oriented database is stored on a hard disk of one or more computing devices.

17. The computer-readable device of claim 15, wherein the auditing request is associated with a legally-enforceable auditing of the column-oriented database.

18. The computer-readable device of claim 15, further configured to:
archive the auditing request and response.

19. The computer-readable device of claim 15, wherein the column-oriented data is privatized across one or more of the users, wherein only a portion of the privatized data is accessible to one or more of the users, wherein the corresponding row-oriented data is de-privatized, and wherein the auditing request has access to the de-privatized row-oriented data.

20. The computer-readable device of claim 15, wherein the column-oriented database is stored at a first storage location and the row-oriented database is stored at a storage location, wherein the first location provides access to the column-oriented data of the column-oriented database faster than the second location provides access to the corresponding row-oriented data of the row-oriented database.

21. The method of claim 1, wherein the auditing request comprises a request for access to data of the column-oriented database that is provided priority over one or more other non-priority access requests for column-oriented data of the column-oriented database by one or more users of the column-oriented database, and wherein the priority indicates that an execution of the one or more other non-priority access requests are blocked until an execution of the auditing request has completed.

22. The method of claim 21, wherein at least one of the other non-priority access requests is requesting access to real-time data of the column-oriented database.

23. The method of claim 1, wherein one or more operations on the column-oriented data are paused while the column-oriented data is retrieved from the column-oriented database, and wherein the one or more operations are resumed after the retrieving is completed.

* * * * *